(12) United States Patent (10) Patent No.: US 7,819,021 B2
Sonnenberg et al. (45) Date of Patent: Oct. 26, 2010

(54) FLUID METER

(75) Inventors: Hans-Michael Sonnenberg, Neuhof/Zenn (DE); Axel Schmidt-Schoenian, Merkendorf (DE); Roland Messthaler, Windsbach (DE)

(73) Assignee: Hydrometer GmbH, Ansbach (DE)

( * ) Notice: Subject to any disclaimer, the term of this patent is extended or adjusted under 35 U.S.C. 154(b) by 187 days.

(21) Appl. No.: 12/072,810

(22) Filed: Feb. 28, 2008

(65) Prior Publication Data

US 2008/0236296 A1 Oct. 2, 2008

(30) Foreign Application Priority Data

Mar. 9, 2007 (DE) ............... 10 2007 011 546

(51) Int. Cl.
*G01F 1/66* (2006.01)
(52) U.S. Cl. .................................... 73/861.26
(58) Field of Classification Search ............ 73/861.29, 73/861.28, 861.31, 861.27, 861.25, 194
See application file for complete search history.

(56) References Cited

U.S. PATENT DOCUMENTS

| | | | | |
|---|---|---|---|---|
| 4,004,461 | A * | 1/1977 | Lynnworth | 73/861.27 |
| 5,546,812 | A * | 8/1996 | Drenthen | 73/861.29 |
| 6,295,872 | B1 * | 10/2001 | Van Der Heide | 73/596 |
| 7,162,930 | B2 * | 1/2007 | Hashimoto et al. | 73/861.25 |
| 7,360,448 | B2 * | 4/2008 | Maginnis et al. | 73/861.27 |
| 2002/0124661 | A1 | 9/2002 | Wagner | |

FOREIGN PATENT DOCUMENTS

| | | |
|---|---|---|
| DE | 92 02 970.1 | 9/1992 |
| DE | 195 03 714 A1 | 8/1996 |
| DE | 296 21 964 U1 | 4/1997 |
| DE | 197 29 473 A1 | 2/1999 |
| DE | 198 08 701 A1 | 9/1999 |
| DE | 103 27 076 B3 | 4/2005 |
| EP | 1 096 236 | 5/2001 |
| EP | 1 731 884 A1 | 12/2006 |

(Continued)

OTHER PUBLICATIONS

Manual "Statical heatmeter 2WR4" with pressure measurement description "0196" (Jan. 1996).

(Continued)

*Primary Examiner*—Jewel Thompson
(74) *Attorney, Agent, or Firm*—Edwards Angell Palmer & Dodge LLP; Jeffrey D. Hsi; Catherine J. Toppin

(57) ABSTRACT

The invention relates to a fluid meter (1) having a measuring tube housing (2), a measuring zone (3) inside the measuring tube housing (2), an ultrasonic transducer configuration of at least one ultrasonic transducer (4 and/or 5) for generating an ultrasonic signal and/or converting an ultrasonic signal passing through the measuring zone (3) into an electric signal and a deflecting device (11) for deflecting the ultrasonic signal in particular in the longitudinal direction of the measuring tube (3) such that the surface normal N of the ultrasonic transducer (4 and/or 5) is arranged so it is inclined laterally based on the top position of the fluid-filled interior of the measuring tube housing (2) in the installed position with the plane E such that the ultrasonic signal does not strike the deflecting device (11) from above in the installed position of the fluid meter (1).

20 Claims, 6 Drawing Sheets

FOREIGN PATENT DOCUMENTS

| | | |
|---|---|---|
| EP | 1 742 024 A1 | 1/2007 |
| GB | 2 429 061 A | 2/2007 |
| WO | WO-00/23773 | 4/2000 |
| WO | WO-00/23773 A2 | 4/2000 |
| WO | WO-02/25222 A1 | 3/2002 |

OTHER PUBLICATIONS

EU-model inspection document of Nov. 27, 2006 for the heat meter "2WR5" by Landis+Gyr GmbH.

Domestic Qualification approval of Jun. 23, 2004 for the complete heat meter "MULTICAL401" by the Danish company Kamstrup A/S.

Domestic qualification approval of Nov. 1995 for the complete heat meter "Multical III" by Kamstrup A/S.

Manual for the ultrasonic flow meter "ULTRAFLOWII" by Kamstrup A/S (English version).

Manual for the measuring system "ultrakon" with ultrasonic heat meter EWZ 810, distributed by IWK Regler and Kompensatoren GmbH and produced by Kamstrup A/S.

* cited by examiner

FLUID METER

CROSS-REFERENCE TO RELATED APPLICATIONS

This application claims priority of German Patent Application 10 2007 011 546.8-52, filed Mar. 9, 2007, the contents of which is incorporated by reference herein.

The present invention relates to a fluid meter having a measuring tube housing, a measurement zone inside the measuring tube housing, an ultrasonic transducer configuration consisting of at least one ultrasonic transducer for generating an ultrasonic signal and/or converting an ultrasonic signal passing through the measurement zone into an electric signal and a deflecting device for deflecting the ultrasonic signal in the longitudinal direction of the measuring tube.

DE 103 27 076 B3 describes a fluid meter according to the definition of the species of claim 1. This fluid meter comprises a multipart measuring tube configuration. A measuring tube made of brass is situated inside a measuring tube housing. Ultrasonic transducers are positioned on the top side of the measuring tube housing in a corresponding recess. The electronic circuit board and display element are usually positioned on the top side of the transducer, each in a parallel arrangement to the ultrasonic transducer surface. A display having a horizontally aligned display plane or a display plane (vertical) rotated by 90° is provided as the standardized installation plane in the case of a horizontal pipeline, e.g., for water as the medium, and in the case of a vertical pipeline, a display having a vertical display plane is provided. The horizontal installation plane with a horizontal display plane is the most common installation configuration occurring in practice. Because of the most important arrangements described previously, the ultrasonic transducer therefore sits at the highest point with fluid flowing through it. This results in the disadvantage that gas bubbles in the fluid adhere to the surface of the transducers and this can cause interference in the measurement. Rotation of the entire fluid meter to prevent the transducer surfaces from being covered with gas bubbles is impossible because fluid meters must be installed in precisely defined installation positions and readability of the display device would no longer be ensured if the display were rotated. Therefore, there are very strict limits to the installation situation.

The object of the present invention is to make available a generic fluid meter with which, first of all, inaccuracies in measurement due to gas bubbles in the area of the surface of the transducer are avoided and, secondly, the strict specifications on installation of fluid meters can be met.

The present object is achieved with the generic fluid meter by the fact that the surface normal N of the ultrasonic transducer to the plane E, based on the top position of the fluid-filled interior of the measuring tube housing in the installed position, is arranged in such a way that the ultrasonic signal does not strike the deflecting device from above in the horizontal installed position of the fluid meter. According to the aforementioned idea, the ultrasonic transducer(s) is (are) no longer situated at the top position in the space through which the medium flows but instead assume(s) a lower position. The gas bubbles present in the fluid therefore collect at a location in the interior of the meter, where they cannot have any effect on the accuracy of the measurement. At the same time, however, the good readability of the fluid meter is maintained because the display device is still at the highest location.

The ultrasonic signal expediently arrives at the side. The lateral angle offset of the surface normal N of the ultrasonic transducer is between 30° and 60°, preferably between 40° and 50°, especially preferably between 42° and 48° to the vertical based on the plane E. For example, the angle may be 45°.

Alternatively, the ultrasonic signal strike the deflecting device 11 from the underside in the installed position. The angle offset of the surface normal N of the ultrasonic transducer in this case is preferably in an angle range between 160° and 200°, preferably 160° to 190°. For example the angle may be 180°.

The advantage of the lateral angle offset of 30° to 60° or 160° to 200° is also due to the fact that when the display unit is rotated by 90° out of the plane of installation to allow the meter to be read laterally, the transducers are also not at the highest point and therefore the air bubbles can also collect only on the side of the transducer. This would not be ensured at an angle of 90°.

In particular the aforementioned angle values for surface normal N of the ultrasonic transducer are based on the perpendicular to the plane of the display A of the display element or at least a holding mechanism for an external display element.

On the basis of the aforementioned features, this ensures that the fluid meter is easily readable and the requirements of an installation that conforms to standards are met but at the same time interference due to air bubbles on the top side of the measuring tube housing can be effectively ruled out.

Another embodiment of the inventive fluid meter, which is also claimed as a dependent claim, is characterized in that another housing in addition to the measuring tube housing is provided to hold electronic parts, and the measuring tube housing is accommodated in a holding mechanism, which can be mounted on the housing. Due to the separation of these two housings by the design and their connectability with offset angles via the holding mechanism, the two housings can easily be positioned in a desired angular position in relation to one another.

The holding mechanism is expediently designed so that the measuring tube housing can be securely clamped in the holding mechanism. This type of mechanical fixation makes it possible to eliminate complex work (such as the creation of threaded bores) on the measuring tube housing, which is made of metal in particular. Only minor machining of the measuring tube housing is necessary (e.g., introducing holding pockets for temperature sensors and/or through-bores for ultrasonic signals). This makes it possible to reduce the number of parts and significantly lower the costs of manufacturing.

Due to the fact that the holding mechanism has a first holding part and a second holding part which form a recess to receive the measuring tube housing, an approach for the fixation that is especially simple in terms of the design is created. The holding mechanism of the aforementioned type extends around the measuring tube housing in the manner of a hose clamp.

The type of fastening described above has the additional advantage that at least one function part can be held in position by the holding mechanism reaching around it. This function part is, for example, a transducer which is accommodated in a pocket or recess, e.g., on the holding part and/or it is a temperature sensor. Only recesses for these function parts need be provided and they are easy to implement in terms of processing technology. The fixation is accomplished by the grip around the holding mechanism. This engagement of the holding mechanism prevents the elements that are to be secured (transducer/temperature sensor) from being forced out of their position by the internal pressure of the medium.

Expediently a twist-proof device may be provided between the measuring tube housing and the holding mechanism, e.g., in the form of a protrusion on the holding mechanism which engages in a corresponding recess on the measuring tube housing or vice versa. When setting the torque on the measuring tube housing, e.g., by screwing same into a fluid line, displacement of the angular position of the measuring tube housing relative to the holding mechanism and thus an incorrect position and/or damage to the interior can be prevented.

In an expedient embodiment of the inventive fluid meter, the first holding part is integrated into the measuring tube housing, i.e., it is designed as a one-piece component of same. This is advantageous in particular when the measuring tube housing is made entirely of plastic.

The second holding part of the holding mechanism (like the electronic housing) is designed expediently as a uniform part (adapter part) to receive first holding parts having different nominal flow cross sections of the measuring tubes. It is thus possible to connect the measuring tube housings with measuring tubes of a wide variety of nominal widths to the housing containing the electronic parts simply by replacing the first holding part.

To this end, several optional installation positions are preferably provided, e.g., several assembly bores are provided at different intervals on the second holding part, so that one installation position or the other may be selected, depending on which first holding part is to be installed.

In a special embodiment of the inventive fluid meter, the second holding part is shaped in or integrally molded on the housing to receive the electronic parts, i.e., provided as an integral component of same.

In cases in which the electronics or an external display device is accommodated in an independent housing, the second holding part may also be designed so that it secures the external housing on a holding mechanism on the second holding part in such a way that the external display element can be read either horizontally or tilted 90° when installed in a position that conforms to standards, and the transducers are positioned with a lateral angle offset in the measuring tube housing.

Alternatively there is the possibility of connecting the second holding part to the housing detachably, e.g., by snap connections or the like. The second holding part may then be produced independently.

Due to the fact that the respective installation position is provided in an area on the second holding part which protrudes laterally away from the housing for the electronic parts, the installation position(s) for attaching the first holding part is (are) especially readily accessible. A type of veranda-like protrusion of the second holding part in particular may be provided on the housing for the electronic parts.

At least one guide duct for a wire connection from the respective transducer and/or from a temperature sensor is expediently provided in the housing. The guide duct ensures a predetermined alignment and positioning of the respective connecting wire during assembly and thus ensures easy installability and a reduction in installation errors.

The first holding part may expediently be designed in the manner of a shell surrounding the measuring tube housing on the bottom side, preferably over its entire length. Alternatively, however, multiple holding parts, e.g., two holding parts may extend around the measuring tube housing at a distance (e.g., on the front side and on the back side) to secure same on the second holding part in the manner of a hose clamp.

If the ultrasonic transducer is also clamped in clamping the two housings to one another in the contact area, then compressive forces occurring on the ultrasonic transducer can easily be absorbed by the housing.

This position also makes it possible to secure additional function parts, e.g., a temperature sensor on the measuring tube housing reliably and in a fixed position without any complex handling measures by securing the function part in the installed position which is secured by the housing for the electronic components and/or by the handle part.

Expedient embodiments of the present invention are explained in greater detail below on the basis of drawings in the figures. Recurring features are indicated only once for the sake of simplicity.

Figure 1:
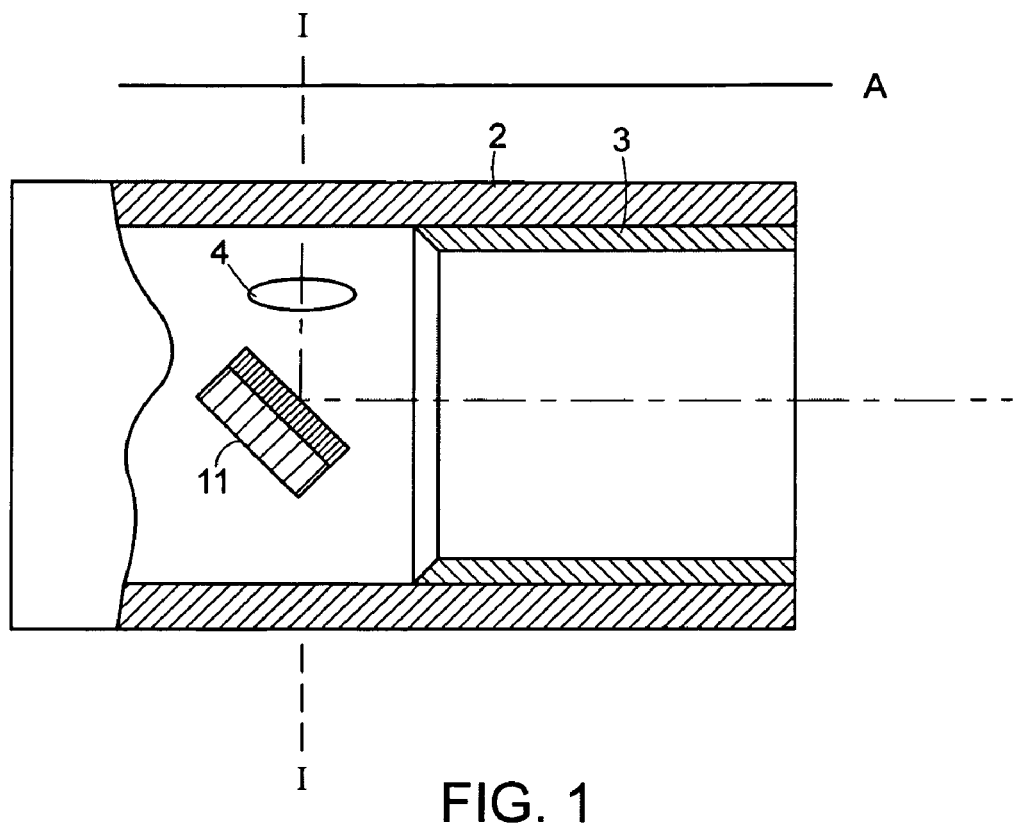
FIG. 1 shows a greatly simplified schematic longitudinal partial sectional diagram of the measuring tube housing of a first embodiment of the fluid meter according to this invention.

FIG. 1 shows a greatly simplified schematic diagram of a part of a first embodiment of a fluid meter 1 according to the present invention. The fluid meter comprises a measuring tube housing 2 in which an elongated measuring tube 3 is positioned to ensure a measuring zone. Within the measuring tube there is a deflecting device 11, e.g., in the form of a mirror with which an ultrasonic signal emitted by an ultrasonic transducer 4 is reflected in the longitudinal direction to the measuring tube 3 and vice versa.

Another housing which accommodates the electronic components, e.g., a display element, such as an LCD screen or the like, sits on the measuring tube housing 2 but is not shown in FIG. 1 for the sake of simplicity. The plane of the display element is labeled as A.

Figure 2:
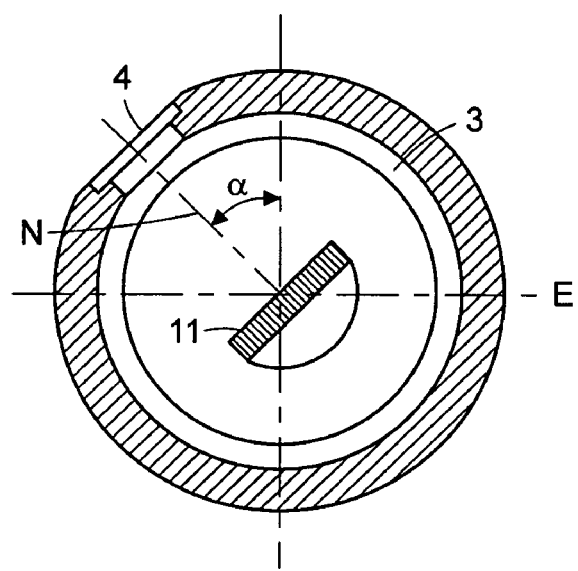
FIG. 2 shows a sectional diagram along line I-I in FIG. 1.

The position of the plane of installation is labeled as E in FIG. 2. As FIG. 2 shows, according to this invention the respective ultrasonic transducer 4 is not arranged at the top location in the interior of the measuring tube housing 2 but instead is at a position which is offset in relation to the top position by an angle ∀ obliquely to the vertical plane of installation E. The inclination of the surface normal N of the ultrasonic transducer 4 to the vertical of the plane E is characterized as having angle ∀. Gas bubbles in the fluid usually collect at the top location in the interior of the measuring tube housing and therefore do not interfere with the propagation of the ultrasonic signal.

Figure 3:
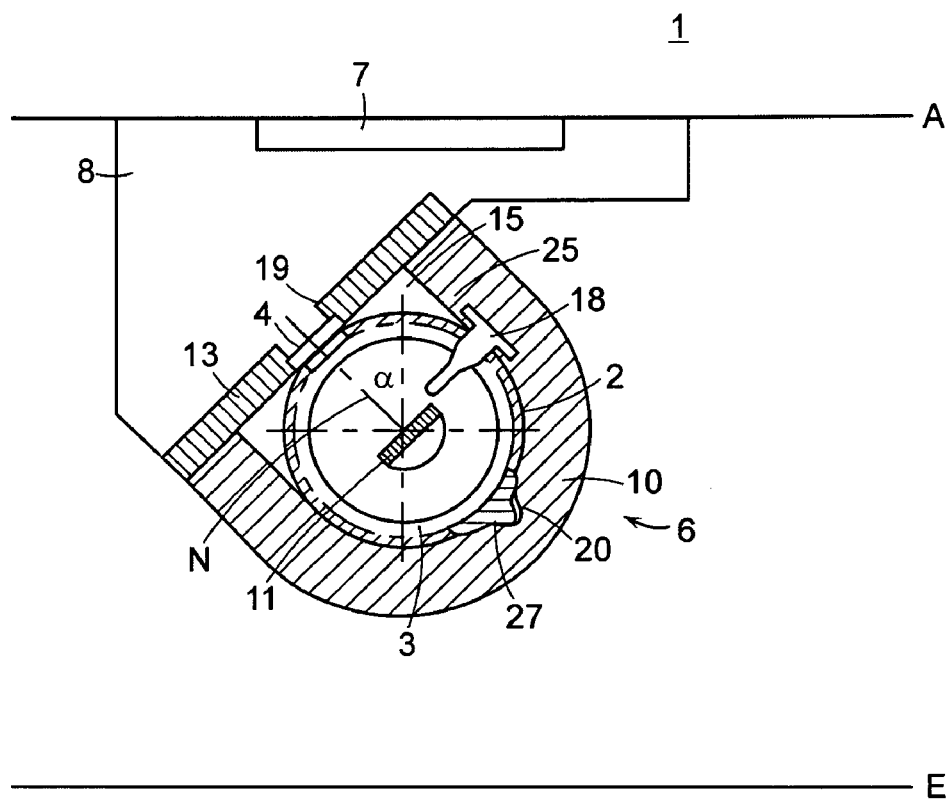
FIG. 3 shows a greatly simplified schematic partial sectional diagram of the first embodiment of the inventive fluid meter with the electronic housing installed.

FIG. 3 shows the measuring tube housing 2 together with a holding mechanism 6 and the housing 8 to accommodate the electronic components. A display element, e.g., in the form of an LCD screen labeled with reference numeral 7 is situated on the top of the housing 8. The display element 7 is situated in the plane A (display plane).

The measuring tube housing 2 is secured on the housing 8 via the holding mechanism 6. The holding mechanism 6 comprises a first holding part 10 which forms a recess 15 and surrounds the measuring tube housing 2. Furthermore, a second holding part 13, which has a plate-like shape in the embodiment according to FIG. 3 is also provided. The measuring tube housing 2 is clamped between the first holding part 10 and the second holding part 13, e.g., by screwing the two holding parts 10, 13, i.e., bracing them together by means of screws (not shown).

Alternatively, the connection of the first and second holding parts 10, 13 may also be accomplished via a one-sided suspension by means of a suspension geometry of the first and second holding parts 10, 13 and opposing screw connection, said suspension geometry being mounted on one side and coordinated with one another.

The ultrasonic transducer 4 is situated here in a relief 19 on the second holding part 13, for example, which is aligned with a borehole in the measuring tube housing 2. In the clamped state the ultrasonic transducer 4 is held within the relief due to the design. Mechanical impairments are advantageously absorbed by the second holding part 13.

In addition, a temperature sensor 18 sits in the pocket 25 on the first holding part 10. This temperature sensor 18 is also held in the pocket 25 due to the design. To allow the first holding part 10 to be pushed into place when the temperature sensor 18 is preinstalled, the pocket 25 runs parallel to the plane of the drawing up to the open end of the first holding part. The pocket 25 is adapted to the size of the temperature sensor 18 inserted into the first holding part. The remaining hollow space (not shown in FIG. 3) is subsequently closed again by a filling piece (also not shown in FIG. 3), e.g., made of plastic or rubber.

A protrusion 21 engaging in a corresponding recess 20 on the first holding part 10 is shaped in the measuring tube housing 2, e.g., on the side opposite the ultrasonic transducer 4. In this way, a twist-proof device is ensured, e.g., in the screw connection of the fluid meter to the power line connection.

The second holding part 13 may be provided as an integral component of the housing 8 or may be connected as an independent part to the housing 8, e.g., via a snap connection, a clamp connection or the like.

The plane E in FIG. 3 indicates the alignment of the plane in the installed position of the fluid meter 1, which is parallel to the display plane A.

Figure 4:
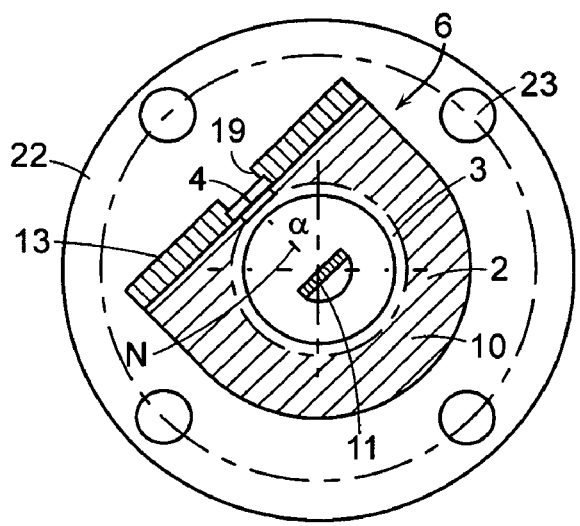
FIG. 4 shows a partial sectional diagram of a second embodiment of the inventive fluid meter (without the measuring tube housing)

FIG. 4 shows a second embodiment of the inventive fluid meter, omitting the housing 8 for the electronic components. The measuring tube housing 2 has a flange 22 with individual flange bores 23 for assembly on the line network in a predetermined position. The flange 22 is usually provided on both ends of the measuring tube housing 2.

The embodiment according to FIG. 4 also has a housing 8 for the electronic components but is not shown in FIG. 4 for the sake of simplicity. Unlike the embodiment according to FIG. 3, the first holding part 10 of holding mechanism 6 is an integral component of the measuring tube housing 2. The measuring tube housing may be made of plastic, for example, in one production step.

The recess 20 shown in FIG. 3 and the protrusion 21 engaging therein are not absolutely necessary in the embodiment according to FIG. 4.

Figure 5A:
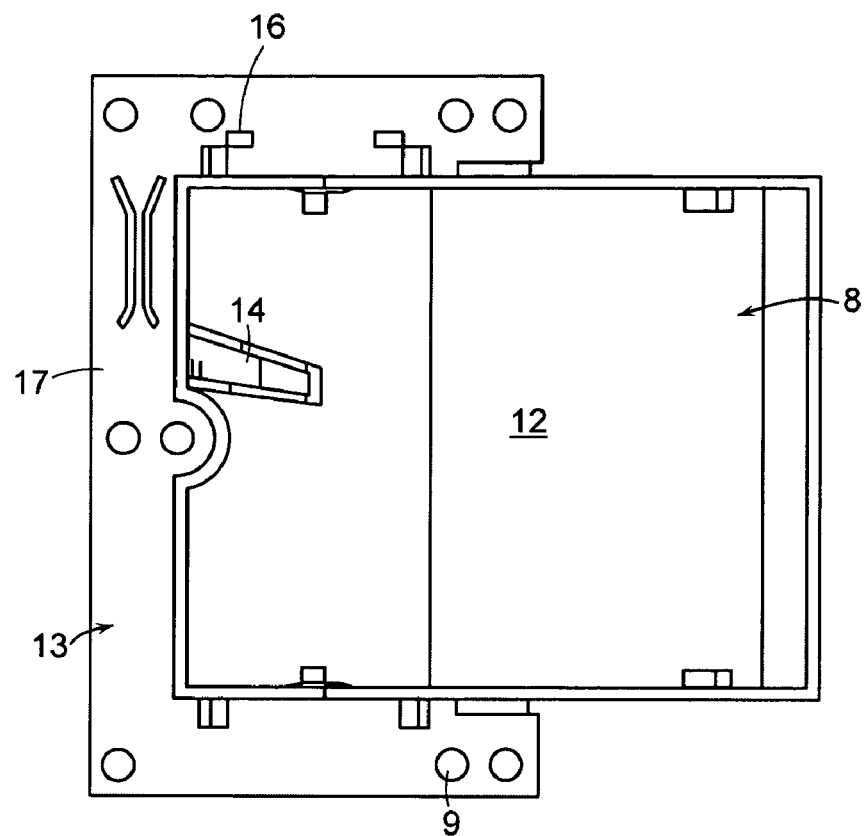
FIG. 5 shows a diagram of the housing for the electronic components with the second holding part of the holding mechanism thereon as seen from above (FIG. 5A), in a perspective view (FIG. 5B) and with the measuring tube housing installed (FIG. 5C)

FIG. 5A shows the housing 8 for the electronic components and the second holding part 13 of the holding mechanism 6 for the measuring tube housing 2. The housing recess 12 is provided to hold a display element, e.g., an LCD screen, etc. In addition, a circuit board having electronic control components plus electronic components for processing measured value and for data reproduction is situated in the area of the housing recess 12.

There is expediently also a power source (not shown) in the area of the housing recess 12.

A guide duct 14 for the line connection of a temperature sensor is shaped in the housing recess 12. The housing 8 is detachably connected to the second holding part 13 via multiple snap connections 16 and is dimensioned here so that the second holding part 13 forms a peripheral protrusion 17 that holds the individual assembly positions, e.g., through-bores.

The second holding part 13 and the housing 8 are both preferably designed as molded plastic parts.

To cover the housing 8, a cover (not shown in FIG. 5A or 5B) is provided and can be connected to the housing 8 by catch connections (also not shown). According to FIG. 5C, in the installed state the first holding part 10, which is in the form of a trough in this case, is closed over almost the entire length of the measuring tube housing 2, securing it in its position.

Figure 6A:
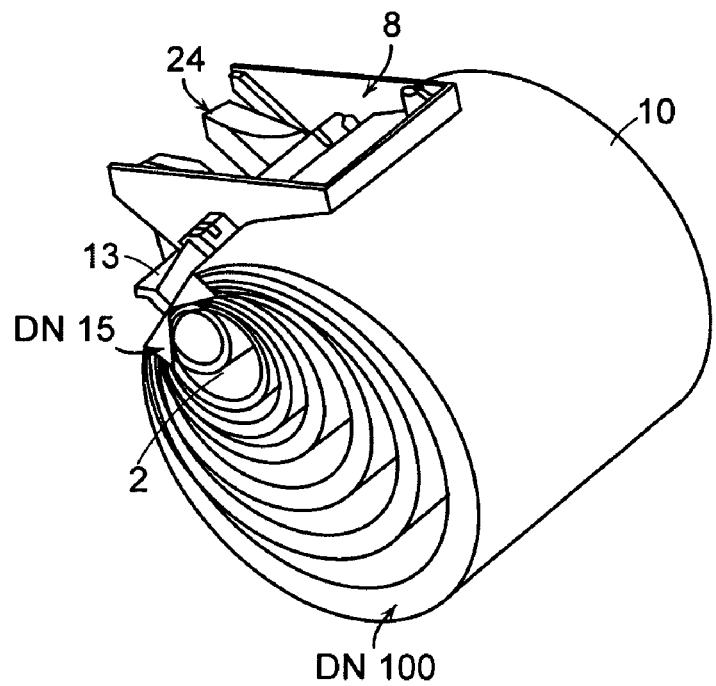
FIG. 6 shows a view of the inventive fluid meter with a comparative arrangement of the measuring tube housings of different nominal widths in a side view (FIG. 6A) and in a view from the end face (FIG. 6B)
Figure 6B:
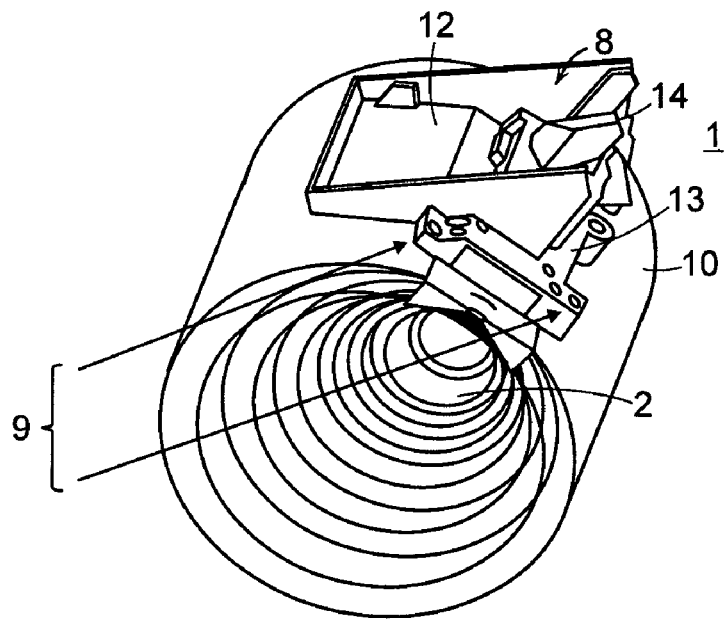

As shown in FIGS. 6A and 6B, a standardized arrangement of housing 8 and second holding part 13 may be used for the measuring tube housing 2 with different nominal diameters (e.g., nominal diameters DN 15-DN 100).

Figure 5B:
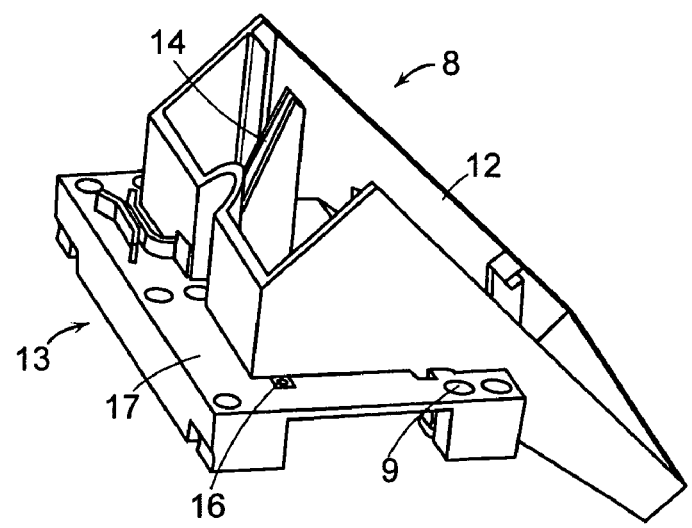
Figure 5C:
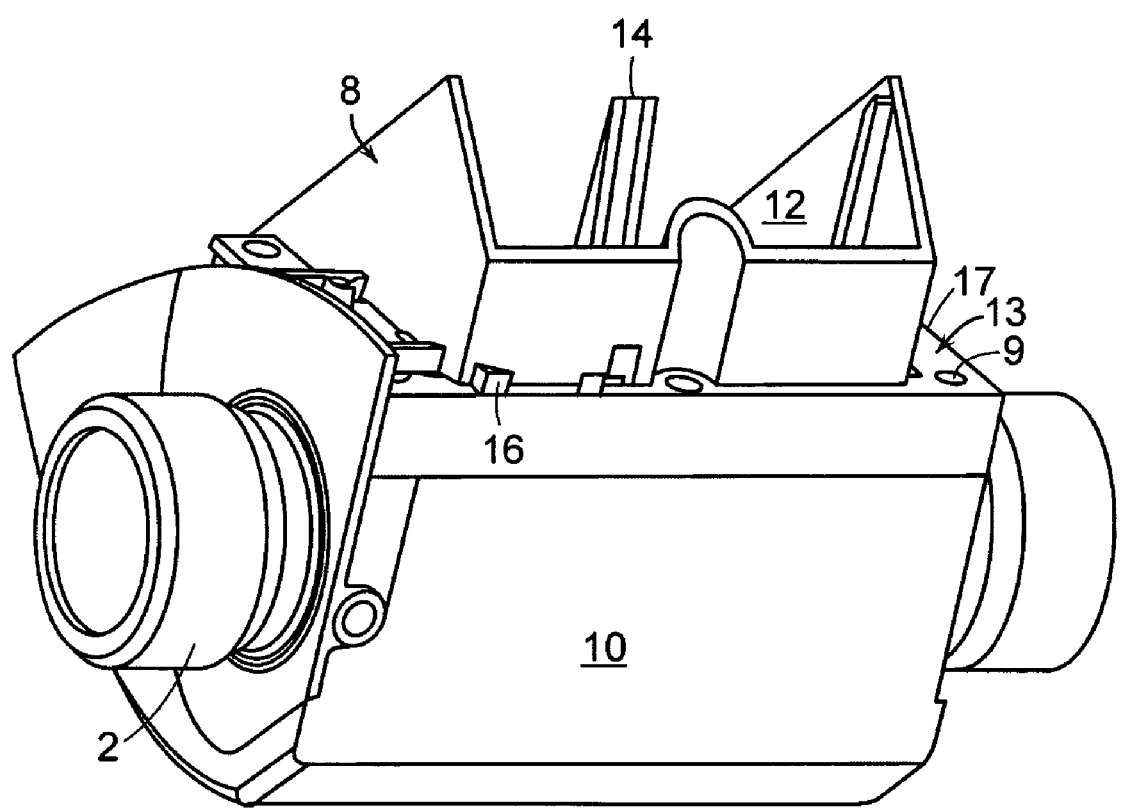

The installation positions 9, which are arranged differently as shown in FIGS. 5A and 5B, for example, make it possible to attach measuring tube housings 2 of different sizes through the choice of the installation positions. The second holding part 13 here acts like an adapter.

Figure 7:
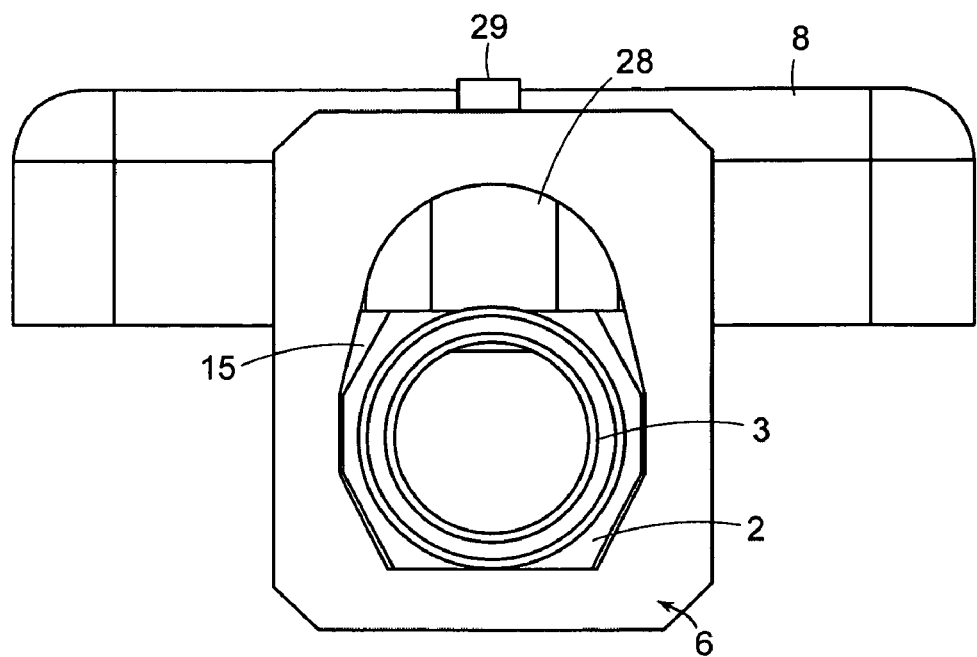
FIG. 7 shows a greatly simplified schematic diagram of a third embodiment of the inventive fluid meter in a view from the side.

FIG. 7 shows another embodiment of the inventive fluid meter in a greatly simplified diagram. To secure the measuring tube housing 2 on the housing 8, a one-piece holding mechanism 6 in the form of a peripheral strap or ring is provided. The holding mechanism 6 is pushed into place in the longitudinal direction, i.e., axially to the longitudinal direction of the measuring tube 3 with the measuring tube housing 2 in position and is secured to the housing 8. For example, a catch (not shown) between the handle part 13 and a shoulder 28 on the housing 8 may be provided for fixation.

The measuring tube housing 2 can be clamped by means of the holding mechanism 6 in a fixed position between the handle part 13 and the housing 8. The shoulder 28 may be designed in one piece with the housing or may be connectable to the housing 8, e.g., by means of a snap connection. A screw 29 may additionally be provided for securing the position of the holding mechanism 6, for equalizing the tolerance and for tightening the measuring tube housing.

Between the measuring tube housing 2 and the shoulder 28, a rubber layer (not shown) may also be provided, also serving to equalize tolerances and to seal the ultrasonic transducer (also not shown). Instead of the rubber layer, other resilient elements, e.g., a compression spring or the like, may also be used to adjust for the tolerance.

Figure 8:
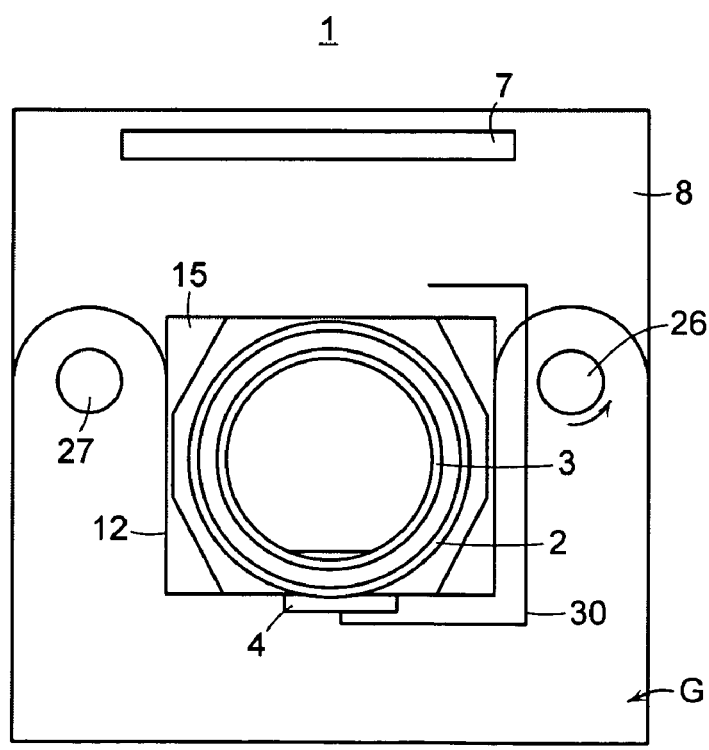
FIG. 8 shows a greatly simplified schematic diagram of a fourth embodiment of the inventive fluid meter in a view from the side.

The embodiment according to FIG. 8 shows a housing 8 with a display element 7 on the top side. The holding mechanism 6 is designed as a C-shaped strap which is connected to the housing 8 via a hinge 26. The housing 8 and the holding mechanism 6 together form a recess 15 to accommodate the measuring tube housing 2. A cable 30 in the strap of the holding mechanism 6 leads from the ultrasonic transducer 4 to the electronic components of the housing 8. The measuring tube housing 2 is inserted into the strap, e.g., after sealing (casting) the housing 8. Then the strap is folded up and snapped onto the snap connection 27 on the housing 8.

LIST OF REFERENCE NUMERALS 1 fluid meter
2 measuring tube housing
3 measuring tube
4 ultrasonic transducer
5 ultrasonic transducer
6 holding mechanism
7 display element
8 housing
9 installation position
10 first holding part
11 deflecting device
12 housing recess
13 second holding part
14 guide duct (temperature sensor)
15 recess
16 snap connection
17 protrusion
18 temperature sensor
19 relief
20 recess
21 protrusion
22 flange
23 flange bores
24 guide duct (transducer cable)
25 pocket
26 hinge
27 snap connection
28 shoulder
29 screw
30 cable

The invention claimed is:

1. A fluid meter comprising:
a measuring tube housing, said measuring tube housing being installed in a plane E defining an installation position of said measuring tube housing;
a measuring zone in the measuring tube housing;
an ultrasonic transducer configuration of at least one ultrasonic transducer for generating an ultrasonic signal or for converting an ultrasonic signal passing through the measuring zone into an electric signal, said ultrasonic transducer having a surface normal N;
a deflecting device for deflecting the ultrasonic signal in particular in the longitudinal direction of the measuring tube;
a display element or a holding mechanism for an external display element, said display element or external display element providing a display plane A;
said surface normal N of the ultrasonic transducer being arranged perpendicular to a longitudinal axis of the measuring tube housing;
said surface normal N of the ultrasonic transducer being arranged at an inclination to the display plane A, and
wherein said display plane A and a plane E are oriented in parallel or perpendicular to each other.

2. A fluid meter according to claim 1, wherein the ultrasonic signal strikes the deflecting device from the side in the installation position.

3. A fluid meter according to claim 1, wherein an angle offset of the surface normal N of the ultrasonic transducer to a vertical based on the plane E is in an angle range from 30° to 60°.

4. A fluid meter according to claim 1, characterized in that the ultrasonic signal strikes the deflecting device from a bottom in the installed position.

5. A fluid meter according to claim 4, wherein the angle offset of the surface normal N of the ultrasonic transducer to the vertical, based on the plane E, is in an angle range of 160° to 200°.

6. A fluid meter according to claim 1, wherein the display element or at least one holding mechanism for an external display element is in the display plane A and, based on the installation plane E of the measuring tube, the display plane A of the fluid meter is aligned essentially parallel.

7. A fluid meter comprising:
a measuring tube housing;
a measuring zone in the measuring tube housing;
an ultrasonic transducer configuration of at least one ultrasonic transducer for generating an ultrasonic signal or for converting an ultrasonic signal passing through the measuring zone into an electric signal and deflecting device for deflecting the ultrasound signal in particular in the longitudinal direction of the measuring zone,
wherein another housing for accommodating electronic parts is provided, and the measuring tube housing is accommodated in a holding mechanism which can be mounted on the housing,
a display element or a holding mechanism for an external display element, said display element or external display element providing a display plane A;
said surface normal N of the ultrasonic transducer being arranged perpendicular to a longitudinal axis of the measuring tube housing;
said surface normal N of the ultrasonic transducer being arranged at an inclination to the display plane A, and
wherein said display plane A and a plane E are oriented in parallel or perpendicular to each other.

8. A fluid meter according to claim 7, wherein the measuring tube housing can be clamped securely in the holding mechanism.

9. A fluid meter according to claim 7, wherein the holding mechanism has a first holding part and a second holding part which form a recess to accommodate the measuring tube housing.

10. A fluid meter according to claim 9, wherein at least one function part, in particular a transducer or a temperature sensor is held in position by the holding mechanism.

11. A fluid meter according to at least one of claim 7 wherein a twist-proof device is provided between the measuring tube housing and the holding mechanism.

12. A fluid meter according to claim 7, wherein the first holding part is integrated into the measuring tube housing.

13. A fluid meter according to claim 7, wherein the second holding part is provided as a uniform part to accommodate first holding parts having different nominal flow-through cross sections.

14. A fluid meter according to claim 13, wherein several selectable installation positions are provided on the second holding part.

15. A fluid meter according to claim 9, wherein the second holding part is shaped in the housing.

16. A fluid meter according to at least one of claim 9, wherein the second holding part is detachably connected to the housing.

17. A fluid meter according to claim 9, wherein the installation position is situated in an area on the first holding part which protrudes laterally from the housing.

18. A fluid meter according to claim 9, wherein at least one guide duct for cable connections is provided in the housing.

19. A fluid meter according to claim 9, wherein the first holding part is designed as a shell.

20. A fluid meter according to claim 9, wherein several first holding parts are provided, extending around the measuring tube housing with a distance between them.

* * * * *